United States Patent
Taki et al.

(10) Patent No.: US 11,512,457 B2
(45) Date of Patent: Nov. 29, 2022

(54) WATER SPOUT CONTROL DEVICE, WATER SPOUT CONTROL SYSTEM, AND WATER SPOUT CONTROL METHOD

(71) Applicant: LIXIL Corporation, Tokyo (JP)

(72) Inventors: Nobuhiro Taki, Tokyo (JP); Yuki Shirai, Tokyo (JP)

(73) Assignee: LIXIL Corporation, Tokyo (JP)

( * ) Notice: Subject to any disclaimer, the term of this patent is extended or adjusted under 35 U.S.C. 154(b) by 123 days.

(21) Appl. No.: 17/042,068

(22) PCT Filed: Dec. 12, 2018

(86) PCT No.: PCT/JP2018/045651
§ 371 (c)(1),
(2) Date: Sep. 25, 2020

(87) PCT Pub. No.: WO2019/187376
PCT Pub. Date: Oct. 3, 2019

(65) Prior Publication Data
US 2021/0010251 A1    Jan. 14, 2021

(30) Foreign Application Priority Data

Mar. 30, 2018    (JP) .............................. JP2018-067373

(51) Int. Cl.
*E03C 1/05*    (2006.01)
*E03C 1/04*    (2006.01)

(52) U.S. Cl.
CPC ............ *E03C 1/057* (2013.01); *E03C 1/0404* (2013.01)

(58) Field of Classification Search
CPC ......... E03C 1/057; E03C 1/0404; G01V 8/10; G06V 2201/70; G06T 7/70
See application file for complete search history.

(56) References Cited

U.S. PATENT DOCUMENTS 3,670,167 A * 6/1972 Forbes ................. H03K 17/941
250/221
4,762,273 A * 8/1988 Gregory .................. E03C 1/057
236/93 R (Continued)

FOREIGN PATENT DOCUMENTS

JP    H3-195523 A    8/1991
JP    H11-36396 A    2/1999

(Continued)

OTHER PUBLICATIONS

Machine translation of WO 2012/067088 retrieved Apr. 7, 2022 (Year: 2022).*

*Primary Examiner* — Janie M Loeppke
(74) *Attorney, Agent, or Firm* — Morrison & Foerster LLP

(57) ABSTRACT

A water spout control device has a target object detector configured to detect a position of a target object as a detection target in a regional image according to an image information of the regional image. The regional image being generated by capturing an imaging target region including a faucet spout. A faucet spout port detector may be configured to detect a position of a faucet spout port of the faucet spout in the regional image. A determiner may be configured to determine whether to discharge water according to the position of the target object detected by the target object detector and the position of the faucet spout port detected by the faucet spout port detector.

12 Claims, 10 Drawing Sheets

(56) References Cited

U.S. PATENT DOCUMENTS

2006/0231782 A1    10/2006  Iott et al.
2018/0305906 A1*   10/2018  Abdel-Fattah .......... E03C 1/057

FOREIGN PATENT DOCUMENTS

| JP | 2015-148107 A | 8/2015 | |
| JP | 2016-41874 A | 3/2016 | |
| JP | 5884554 B2 | 3/2016 | |
| WO | WO-2012067088 A1 * | 5/2012 | ............. E03C 1/057 |

* cited by examiner

| CASE NUMBER | PRIOR POSITION 3 | PRIOR POSITION 2 | PRIOR POSITION 1 | DETAIL OF SWITCHING PROCESS |
|---|---|---|---|---|
| 1 | SINK | COOKTOP | NONE | HOT WATER |
| 2 | NONE | NONE | NONE | PURIFIED WATER |
| 3 | NONE | SINK | NONE | TAP WATER |

WATER SPOUT CONTROL DEVICE, WATER SPOUT CONTROL SYSTEM, AND WATER SPOUT CONTROL METHOD

CROSS-REFERENCE TO RELATED APPLICATIONS

This application is a national stage application under 35 USC 371 of International Application No. PCT/JP2018/045651, filed Dec. 12, 2018, which claims the priority of Japanese Application No. 2018-067373, filed Mar. 30, 2018, the entire contents of each of which are incorporated herein by reference.

FIELD OF THE DISCLOSURE

The present disclosure relates to a water spout control device, a water spout control system, and a water spout control method.

In recent years, along with the development of a behavior recognition technology for recognizing an intention of a human behavior from the human behavior itself, development of a system configured to automatically understand the intention of a human so as to properly control a faucet even if the human does not operate the faucet is expected.

For example, a technology of providing a camera in a tip end portion of a faucet spout, determining a handwash action of the human according to an image captured by the camera, and prompting the human to proper handwash action in response to a situation is disclosed (see Patent Document 1).

A technology of determining the degree of dirtiness of a cleaning object which is put out to be in front of a faucet spout port by the image captured by the camera, wherein the camera is provided in the faucet so as to be able to capture an image of the vicinity of the faucet spout port, and a technology of controlling a flow rate and a water pressure of the water to be discharged and a form of the water to be discharged, such as a straight water flow or a shower water flow for example are disclosed (see Patent Document 2).

Patent Document 1 Japanese Patent No. 5884554
Patent Document 2 Japanese Unexamined Patent Application, First Publication No. 2015-148107

SUMMARY OF THE DISCLOSURE

However, in a situation of utilizing the above described technologies, a camera, a sensor and the like have to be provided in the tip end portion of the faucet spout and the faucet. Accordingly, in a situation when the water is poured on the faucet spout, there is possibility that water droplets stick to the camera lens and the sensor window. In a situation of cleaning the cleaning object, there is possibility that dirt such as splash of cleaning solvent and the like sticks to the camera lens and the sensor window from the cleaning object to soil the camera lens and the sensor window. In a case of determining the handwash action and the like according to an unclear image captured by the camera whose lens are soiled, there is possibility that the determination result becomes incorrect. In a case that the sensor window is soiled, there is possibility to lead to a misdetection of the target object.

In order to provide the camera and the sensor in the tip end portion of the faucet spout, it is necessary to make the camera and a sensor circuit integrated in the faucet including the faucet spout port. In this case, since it is necessary to secure a space for disposing the camera and the sensor circuit, a design of the faucet may be restricted.

The present disclosure is made in consideration of such circumstances, and one advantage is to provide a water spout control device, a water spout control system, and a water spout control method so as to control the water discharging according to the detection result without making the camera and the sensor circuit to be integrated in the faucet.

According to some embodiments of the present disclosure, a water spout control device has a target object detector configured to detect a position of a target object as a detection target in a regional image according to an image information of the regional image, the regional image being generated by capturing an imaging target region including a faucet spout, a faucet spout port detector configured to detect a position of a faucet spout port of the faucet spout in the regional image, and a determiner configured to determine whether to discharge water according to the position of the target object detected by the target object detector and the position of the faucet spout port detected by the faucet spout port detector.

In the water spout control device according some embodiments, the target object detector may detect the position of the target object in each of the regional images in a time series, and the water spout control device may further include a switcher configured to switch a water discharging state regarding the water to be discharged according to the position of the target object at time of being detected by the target object detector and the position of the target object at any time before the time when the target object is detected by the target object detector.

In the water spout control device according to some embodiments, the switcher may be configured to switch the water discharging state according to a change of the positions of the target object detected by the target object detector in the time series.

The water spout control device according to some embodiments, may further include a state detector configured to detect a state of the target object according to the regional image and the target object detected by the target object detector, and the switcher may be configured to switch the water discharging state according to the state of the target object detected by the state detector.

The water spout control device according to some embodiments, may further include a characteristic extractor configured to extract characteristic of a human in the regional image according to the regional image, and the switcher may be configured to switch the water discharging state according to the characteristic of the human extracted by the characteristic extractor.

The water spout control device according to some embodiments, may further include a behavior extractor configured to extract a behavior of a human in the regional image according to the regional image, and the switcher may be configured to switch the water discharging state according to the behavior of the human extracted by the behavior extractor.

The water spout control device according to some embodiments, may further include an instruction detector configured to detect a content of an instruction according to an instruction information indicating the instruction to switch the water discharging state, and the switcher may be configured to switch the water discharging state according to the content of the instruction detected by the instruction detector.

In the water spout control device according to some embodiments, the switcher may be configured to update a water discharging condition to switch the water discharging state according to the content of the instruction acquired from the instruction detector.

In the water spout control device according to some embodiments, the water discharging state may be at least one of a type of the water to be discharged or a form of the water to be discharged.

According to some embodiments of the present disclosure, a water spout control system has an imaging device configured to capture a regional image including a faucet spout and the water spout control device described above which is configured to acquire the image information of the regional image captured by the imaging device.

In a water spout control method according to some embodiments of the present disclosure, a target object detector detects a position of a target object as a detection target in a regional image according to an image information of the regional image in which an imaging target region including a faucet spout, a faucet spout port detector detects a position of a faucet spout port of the faucet spout in the regional image, and a determiner determines whether to discharge water according to the position of the target object detected by the target object detector and the position of the faucet spout port detected by the faucet spout port detector.

According to the water spout control device, the water spout control system, and the water spout control method according to some embodiments, there is possibility to control the water discharging according to the detection result without making the camera and the sensor circuit to be integrated in the faucet.

DETAILED DESCRIPTION OF THE DISCLOSURE

Hereinafter, water spout control systems and water spout control devices according to some embodiments of the present disclosure will be described by referring to figures.

At first, some embodiments will be described.

Figure 1:
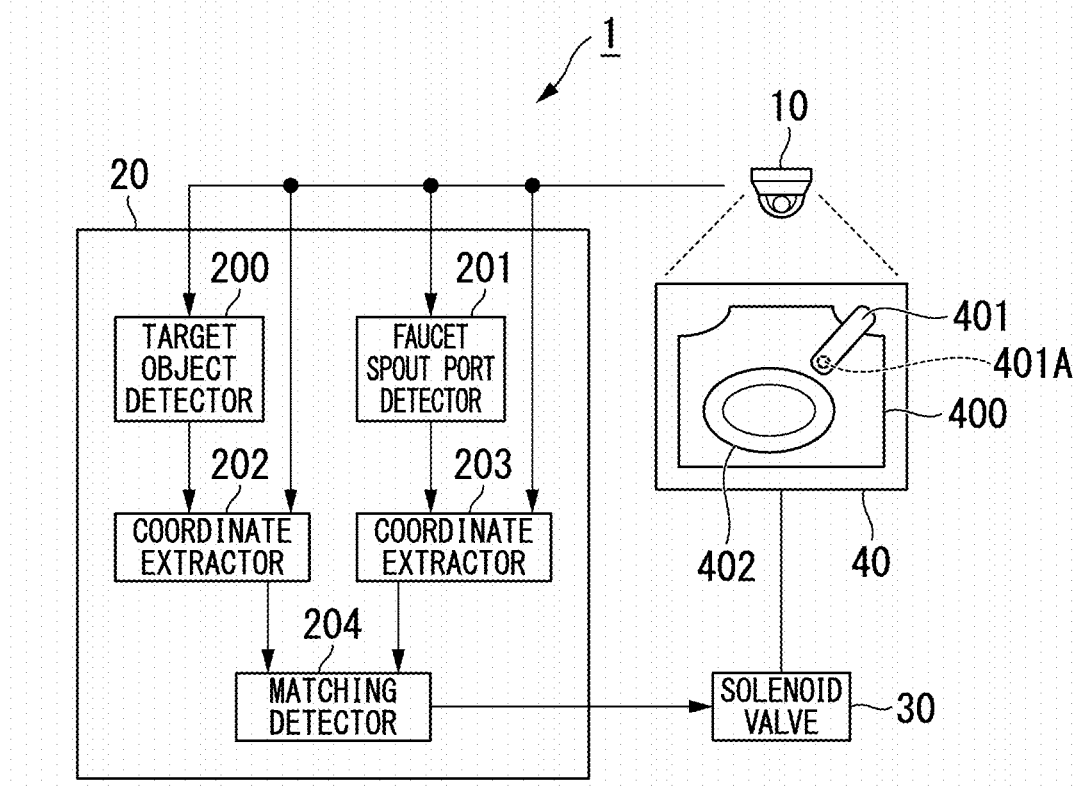
FIG. 1 is a block diagram showing a configuration example of a water spout control system 1 according to some embodiments.

FIG. 1 is a block diagram showing a configuration example of a water spout control system 1 according to some embodiments. The water spout control system 1, for example, has an imaging device 10 and a water spout control device 20. The water spout control device 20 is connected to a solenoid valve 30 configured to make a faucet spout 401 start or finish discharging water. In the water spout control system 1, the water spout control device 20 controls water discharging or stopping the water discharging by a control signal to open and close the solenoid valve 30 of the faucet spout 401 according to an image of an imaging target region 40 captured by the imaging device 10. Here, the image of the imaging target region 40 captured by the imaging device 10 is an example of a "regional image".

The imaging device 10, for example, is disposed at a place such as a kitchen and the like where water is utilized and configured to capture an image of the imaging target region 40. The imaging target region 40 is a region including the faucet spout 401, for example, a region such as a worktop and the like where water equipment such as a sink 400 in which the faucet spout 401 is disposed. The imaging device 10, for example, captures an image of a broader region than that of the sink 400, i.e. a region including the sink 400 and a stove 405. The imaging device 10, for example, is disposed in the surrounding of the faucet spout 401 such as a ceiling of the kitchen, an external lateral surface of a base plate of a wall cabinet, and the like. In a case when the imaging device 10 is disposed on the ceiling of the kitchen, a bulb type camera attachable to a luminaire wiring apparatus may be utilized. In this case, the imaging device 10 operates by power supplied from the luminaire wiring apparatus. In this case, the imaging device 10 is disposed in the upward direction of the faucet spout 401. In this case, the imaging device 10, for example, is disposed so as to make a region at a lower side viewed from the upward direction of the faucet spout 401 be the imaging region. In other words, the imaging device 10 captures an image of the region including the faucet spout 401 from a position viewing down the faucet spout 401.

The imaging device 10 transmits an image information of the captured image to the water spout control device 20. The imaging device 10 transmits the image information of the captured image to the water spout control device 20 via a wireless communication line such as a WiFi, for example. The imaging device 10 may capture a still image or a motion image. The imaging device 10 may capture a color image or a monochrome image.

The water spout control device 20, for example, has a target object detector 200, a faucet spout port detector 201, a coordinate extractor 202, a coordinate extractor 203 and a matching detector 204. The matching detector 204 is an example of a "determiner".

The target object detector 200 detects whether the target object existing in an image according to the image of the imaging target region 40 which is captured by the imaging device 10. The target object refers to an object which may be a target of the water discharging, for example, a dish 402, a pot 403 (see FIG. 2), a cup, a human hand, and the like. Hereinafter, the target object will be simply described as the object.

The target object detector 200, for example, is configured to extract various objects captured in the image by performing an edge detection. The target object detector 200, for example, performs the edge detection according to a luminance difference in the image data. Specifically, the target object detector 200 applies various rectangle frames, in other words, various cells in the image, and when the luminance difference of the external circumference of the frame compared to that inside the frame is small, the target object detector 200 determines that there is an object inside the frame and extracts the object from the image by extracting the frame.

The target object detector 200 selects the target object from the objects extracted from the image. The target object detector 200, for example, stores images of the target objects such as the dishes and the like that are captured in various imaging conditions, for example imaging angle, illumination and the like in advance. The target object detector 200, for example, sets the same scale for the image of the target object stored in advance and the image of the object extracted from the image captured by the imaging device 10 and then compares the pixels in the two images. The target object detector 200, for example, determines that the object extracted from the image is the target object in a case when a tendency of color distribution per each pixel matches with each other at a degree equal to or more than a predetermined threshold. The target object detector 200 outputs a detection result to the coordinate extractor 202.

The faucet spout port detector 201 detects whether the faucet spout port 401A exists in the image according to the image of the imaging target region 40 captured by the imaging device 10. The faucet spout port detector 201, for example, detects that the faucet spout port 401A exists in the image in a case when an end portion of the sink 400 in the faucet spout 401 is captured in the image. The faucet spout port detector 201, for example, detects that the faucet spout port 401A does not exist in the image in a case when the end portion of the sink 400 in the faucet spout 401 is hidden by another object so as to not be captured in the image. The faucet spout port detector 201 outputs the detection result to the coordinate extractor 203. In some embodiments, the faucet spout port 401A is disposed at a downstream side of a flow path of the faucet spout 401.

The coordinate extractor 202 extracts positional coordinates indicating the position of the target object in the image according to the image captured by the imaging device 10 and the detection result output from the target object detector 200. The positional coordinate may be a coordinate indicating a gravity center of the target object, and the positional coordinates may be coordinate groups indicating the external circumference of the target object. The coordinate extractor 202 outputs the extracted positional coordinates of the target object in the image to the matching detector 204.

The coordinate extractor 203 extracts positional coordinates indicating a position of the faucet spout port 401A in the image according to the image captured by the imaging device 10 and the detection result output from the faucet spout port detector 201. The coordinate extractor 203 outputs the extracted positional coordinates of the faucet spout port 401A in the image to the matching detector 204.

As shown above, an example of extracting the positional coordinates of the faucet spout port 401A by the coordinate extractor 203 according to the image captured by the imaging device 10 is described, however, the present disclosure it not limited thereto. The coordinate extractor 203, for example, may detect the position of the faucet spout port 401A according to a rotary angle of the faucet spout 401 in a case when the position of the faucet spout port 401A is movable by rotating the faucet spout 401 with a length of the faucet spout 401 in a longitudinal direction as a rotation radius. In this case, the faucet spout 401, for example, may have a rotary angle measurement device such as a rotary encoder and the like for detecting the rotary angle of the faucet spout 401 to be disposed at a side different from the side of the faucet spout port 401A in the faucet spout 401, that is, at a root portion of the faucet spout 401. The rotary angle measurement device is configured to measure the rotary angle of the faucet spout 401 and output the measurement result to the coordinate extractor 203. The coordinate extractor 203 extracts the positional coordinates of the faucet spout port 401A according to the measurement result from the rotary angle measurement device, the coordinates of the root portion of the faucet spout 401 and the length of the faucet spout 401 in the longitudinal direction that are already known.

The coordinate extractor 203 may be configured to acquire a control information for controlling a motor from a driver configured to drive the motor in a case when the rotation of the faucet spout 401 is controlled by an operation of the motor. The coordinate extractor 203 calculates the rotary angle of the faucet spout 401 according to the control information for controlling the motor and extract the positional coordinates of the faucet spout port 401A according to the calculated rotary angle.

The matching detector 204 detects whether the positional coordinates of the target object extracted from the coordinate extractor 202 and the positional coordinates of the faucet spout port 401A extracted from the coordinate extractor 203 match with each other. The matching detector 204, for example, determines that both of the positional coordinates match with each other in a case when a distance between the positional coordinates of the target object and the positional coordinates of the faucet spout port 401A is less than a predetermined threshold. The matching detector 204 determines that both of the positional coordinates match with each other in a case when the positional coordinates of the faucet spout port 401A are included in a region in which the target object assumed according to the positional coordinates of the target object exists.

The matching detector 204 determines to open the solenoid valve 30 for tap water and outputs a control information indicating the determination to the solenoid valve 30 in a case when it is determined that the positional coordinates of the target object and the positional coordinates of the faucet spout port 401A match with each other. The matching detector 204 determines to close the solenoid valve 30 and outputs the control information indicating the determination to the solenoid valve 30 in a case when it is determined that the positional coordinates of the target object and the positional coordinates of the faucet spout port 401A do not match with each other. At this time, the matching detector 204 may store and keep the open and close state of the solenoid valve 30 in a storage which is not shown in the figure, and the matching detector 204 may perform the control process to output the control information to the solenoid valve 30 in the case of changing the state of the solenoid valve 30. Specifically, the matching detector 204 outputs the control information for opening the solenoid valve 30 in the case of changing the solenoid valve 30 from the closed state to the open state, and the matching detector 204 outputs the control information for closing the solenoid valve 30 in the case of changing the solenoid valve 30 from the open state to the closed state.

The general process of operations of the water spout control device 20 will be described below.

At first, the water spout control device 20 acquires an image information of the image of imaging target region 40 that is captured by the imaging device 10. The water spout control device 20 outputs the acquired image information to the target object detector 200 and the faucet spout port detector 201.

Next, the target object detector 200 detects whether the target object is included in the image. The target object detector 200 outputs the detection result to the coordinate extractor 202. The coordinate extractor 202 extracts the positional coordinates of the target object and output the extracted positional coordinates to the matching detector 204.

The faucet spout port detector 201 detects whether the faucet spout port 401A is included in the image. The faucet spout port detector 201 outputs the detection result to the coordinate extractor 203. The coordinate extractor 203 extracts the positional coordinates of the faucet spout port 401A and outputs the extracted positional coordinates to the matching detector 204.

The matching detector 204 controls the water discharging due to the control information for opening/closing the solenoid valve 30 according to the positional coordinates extracted from each of the coordinate extractor 202 and the coordinate extractor 203.

As described above, the water spout control device 20 according to some embodiments has a target object detector 200 and a coordinate extractor 202 which are configured to detect a position of a target object as a detection target in a regional image according to an image information of the regional image in which an imaging target region 40 including a faucet spout 401, a faucet spout port detector 201 and a coordinate extractor 203 which are configured to detect a position of a faucet spout port 401A of the faucet spout 401 in the regional image, and a matching detector 204 configured to determine whether to discharge water according to the position of the target object detected by the target object detector 200 and the position of the faucet spout port 401A detected by the faucet spout port detector 201. Accordingly, the water spout control device 20 according to some embodiments determines whether the target object is put out to the faucet spout port 401A according to the positions of the faucet spout port 401A in the faucet spout 401 and the dish 402 and the like as the target objects according to the regional image. When the target object is put out to the faucet spout port 401A, the water spout control device 20 recognizes the human actions of putting out the target object as an action of discharging the water to the target object and the water spout control device 20 may start the water discharging. Accordingly, without integrating the camera and the sensor circuit in the faucet, the water spout control device 20 recognizes human actions and automatically controls the water discharging.

Next, some embodiments will be described. A water spout control system 1A according to some embodiments is different from some embodiments described above in that during the water discharging, a type of the water to be discharged is selected from either tap water, purified water, and hot water. The type of the water to be discharged is an example of a state corresponding to the water to be discharged, i.e. "a water discharging state". The type of the water to be discharged is not limited thereto, for example, functional water such as hot purified water, carbonated water, sterilized water, alkaline ionized water, and the like may be included.

Hereinafter, features different from some embodiments described above will be described, the configurations having the same or similar functions with respect to some embodiments described above will be designated as the same reference sign and the reductant description will be omitted.

Figure 2:
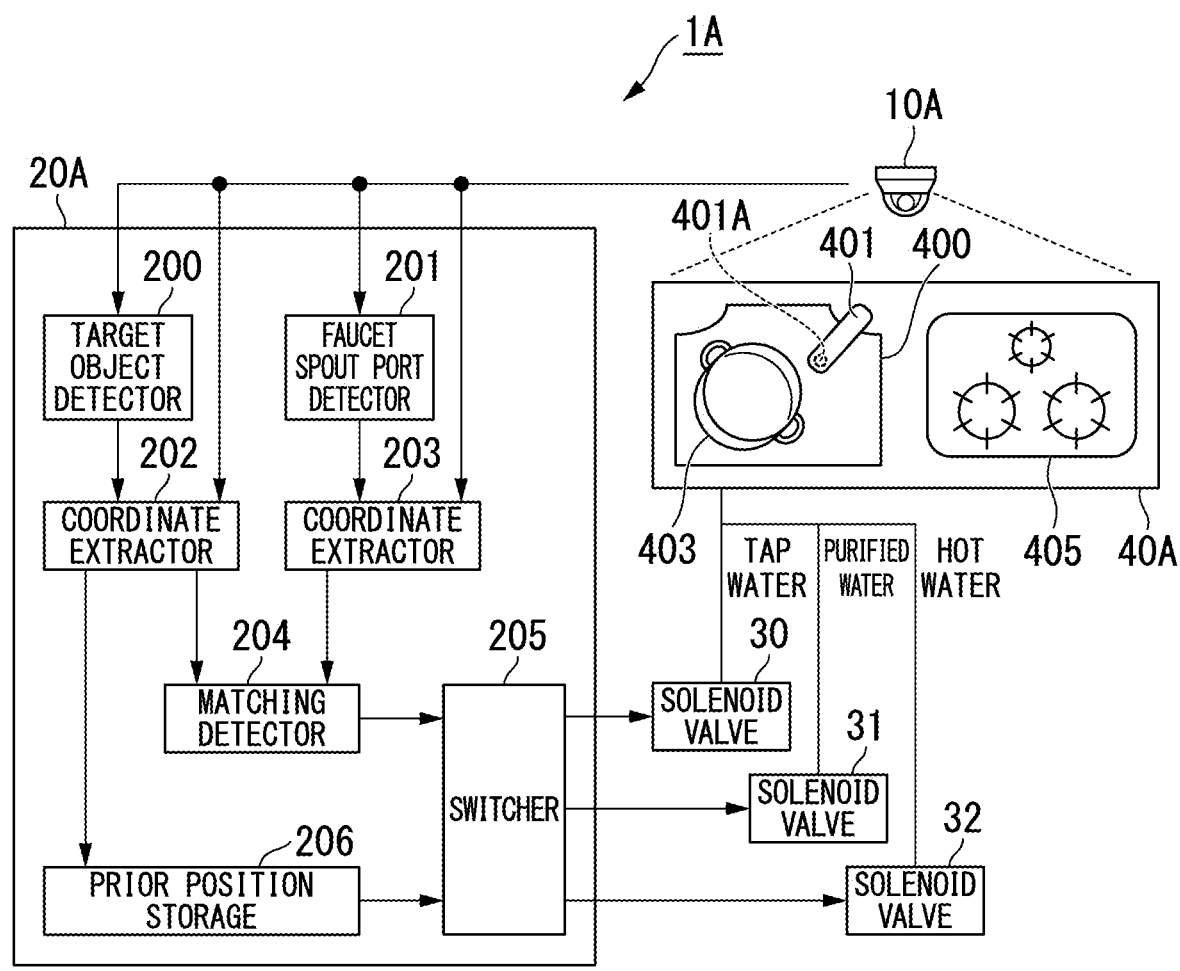
FIG. 2 is a block diagram showing a configuration example of a water spout control system 1A according to some embodiments.

FIG. 2 is a block diagram showing a configuration example of the water spout control system 1A according to some embodiments. The water spout control system 1A has an imaging device 10A and a water spout control device 20A. The water spout control device 20A is connected to each of the solenoid valve 30 for making the faucet spout 401 to discharge tap water, a solenoid valve 31 for making the faucet spout 401 to discharge purified water, and a solenoid valve 32 for making the faucet spout 401 to discharge hot water.

The imaging device 10A is configured to capture images of an imaging target region 40A at predetermined time intervals. Besides the water equipment such as the sink 400 and the like, the imaging device 10A captures images of a region as an imaging target region 40A in which equipment that may be a movement source in a case when the target object moves to the vicinity of the faucet spout port 401A. The equipment that may be the movement source refers to the equipment in which the target object exists before the target object is moved to the sink 400, and is an example of "a prior position".

The equipment that may be the movement source refers to, for example, the stove 405, a dining table, a workbench for presenting dish after preparation and cooking of the food, a kitchen cabinet for accommodating dishes and cups, and a storage rack for accommodating the pots and the like. For example, after cooking using the pot 403 at the stove 405, in order to clean the pot 403 after the cooking, there is a case in which the human moves the pot 403 from the stove 405 to the sink 400. In this case, since the target object, i.e. the pot 403 is moved from the stove 405 to the sink 400, the equipment may be the movement source refers to the stove 405.

The coordinate extractor 202 sequentially acquires the images captured by the imaging device 10A at predetermined time intervals. The coordinate extractor 202 detects the target object in each of the images in time series which are sequentially acquired from the imaging device 10A. In a case when the target object exists at the equipment as the movement source, i.e. the stove 405 for a predetermined period according to the images in time series, the coordinate extractor 202 makes a prior position storage 206 store an information by associating the target object and the equipment as the movement source.

Specifically, the coordinate extractor 202 extracts the positional coordinates of the target object in the image captured by the imaging device 10A, and the coordinate extractor 202 determines whether the target object exists in the movement source equipment, i.e. the stove 405 for a predetermined period according to the extracted positional coordinates. In a case when the coordinate extractor 202 determines that the target object exists in the movement source equipment for the predetermined period, the coordinate extractor 202 makes the prior position storage 206 store the information generated by associating the target object with the positional coordinates.

The matching detector 204 detects whether the positional coordinates of the target object which are extracted by the coordinate extractor 202 and the positional coordinates of the faucet spout port 401A which are extracted by the coordinate extractor 203 match with each other, and the matching detector 204 outputs the detection result to the switcher 205.

The switcher 205 determines whether to perform the water discharging according to the detection result output by the matching detector 204. In the case of performing the water discharging, the switcher 205 selects the type of the water to be discharged from either of tap water, purified water, and hot water according to the contents stored in the prior position storage 206. The switcher 205, for example, determines to open the solenoid valve 30 for tap water in the case when it is determined that the positional coordinates of the target object and the positional coordinates of the faucet spout port 401A match with each other. The switcher 205 selects the type of water to be discharged according to the movement source of the target object by referring to the prior position storage 206.

The switcher 205, for example, in the case when the pot 403 as the target object is moved from the stove 405 to the sink 400, recognizes that the human attempts to clean the dirty pot 403 used for cooking from the actions of moving the pot 403 from the stove 405 to the sink 400 by the human. In this case, the switcher 205 determines to open the solenoid valve 32 for hot water and makes the faucet spout 401 to perform the water discharging. Since it is assumed that oil stain adheres to the pot 403 used for cooking at the stove 405, it is more suitable to use hot water to clean the oil stain than using tap water.

The switcher 205, for example, in the case when the cup as the target object is moved from the kitchen cabinet to the sink 400, recognizes that the human attempts to fetch the cup accommodated in the kitchen cabinet to fill the cup with drinking water according to the actions of moving the cup from the kitchen cabinet to the sink 400 by the human. In this case, the switcher 205 determines to open the solenoid valve 31 for purified water and makes the faucet spout 401 perform the water discharging.

The switcher 205, for example, in the case when the cup as the target object is moved from the dining table and the workbench to the sink 400, recognizes that the human attempts to fetch the cup that is used by the human at the dining table and the like to the sink 400 and clean the cup from the actions of moving the cup from the dining table and the like to the sink 400 by the human. In this case, the switcher 205 determines to open the solenoid valve 30 for tap water and makes the faucet spout 401 perform the water discharging. It is assumed that relatively litter dirt compared with the oil stain adheres to the cup after the drinking water is drunk and it is considered to be enough to use tap water to clean the slight amount of dirt.

The prior position storage 206 stores the information by associating the target object and the corresponding positional coordinates output by the coordinate extractor 202.

Figure 3:
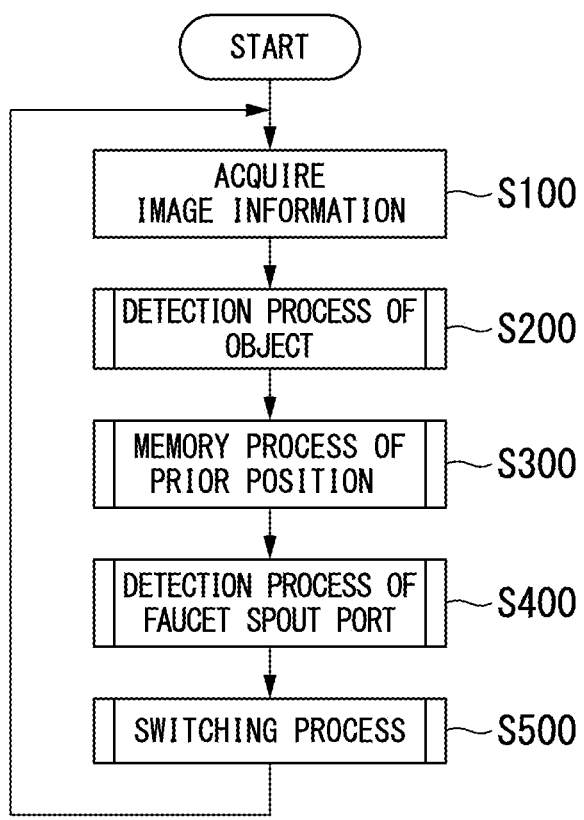
FIG. 3 is a flowchart showing an operation example of a water spout control device 20A according to some embodiments.

FIG. 3 is a flow chart showing an operation example of the water spout control device 20A according to some embodiments. Hereinafter, the general flow of the operations of the water spout control device 20A will be described by using FIG. 3. In the description below, the target object will be described as "object" only. In the description below, the imaging target region 40A shows an example of a region where the sink 400 and the stove 405 are provided and a region where the kitchen cabinet, the workbench, and the storage rack for the pot and the like are not captured.

At first, the water spout control device 20A acquires an image information of an image of the imaging target region 40A captured by the imaging device 10A (Step S100). The water spout control device 20A outputs the acquired image information to the target object detector 200 and the faucet spout port detector 201.

Next, the target object detector 200 performs a detection process for an object to detect whether the target object is included in the image (Step S200). The target object detector 200 outputs the detection result to the coordinate extractor 202.

Subsequently, the coordinate extractor 202 extracts the positional coordinates of the target object, and the coordinate extractor 202 performs the prior position storage process to make the prior position storage 206 store the coordinates as the movement source of the target object according to the extracted coordinates (Step S300).

Subsequently, the faucet spout port detector 201 performs a detection process of the faucet spout port 401A to detect whether the faucet spout port 401A is included in the image (Step S400). The faucet spout port detector 201 outputs the detection result to the coordinate extractor 203. The coordinate extractor 203 extracts the positional coordinates of the faucet spout port 401A and outputs the extracted positional coordinates to the matching detector 204.

The matching detector 204 and the switcher 205 perform the switching process to switch the water discharging according to the detection result by the target object detector 200, the content of the prior position storage process by the coordinate extractor 202, and the detection result of the faucet spout port 401A by the faucet spout port detector 201 (Step S500).

Figure 4:
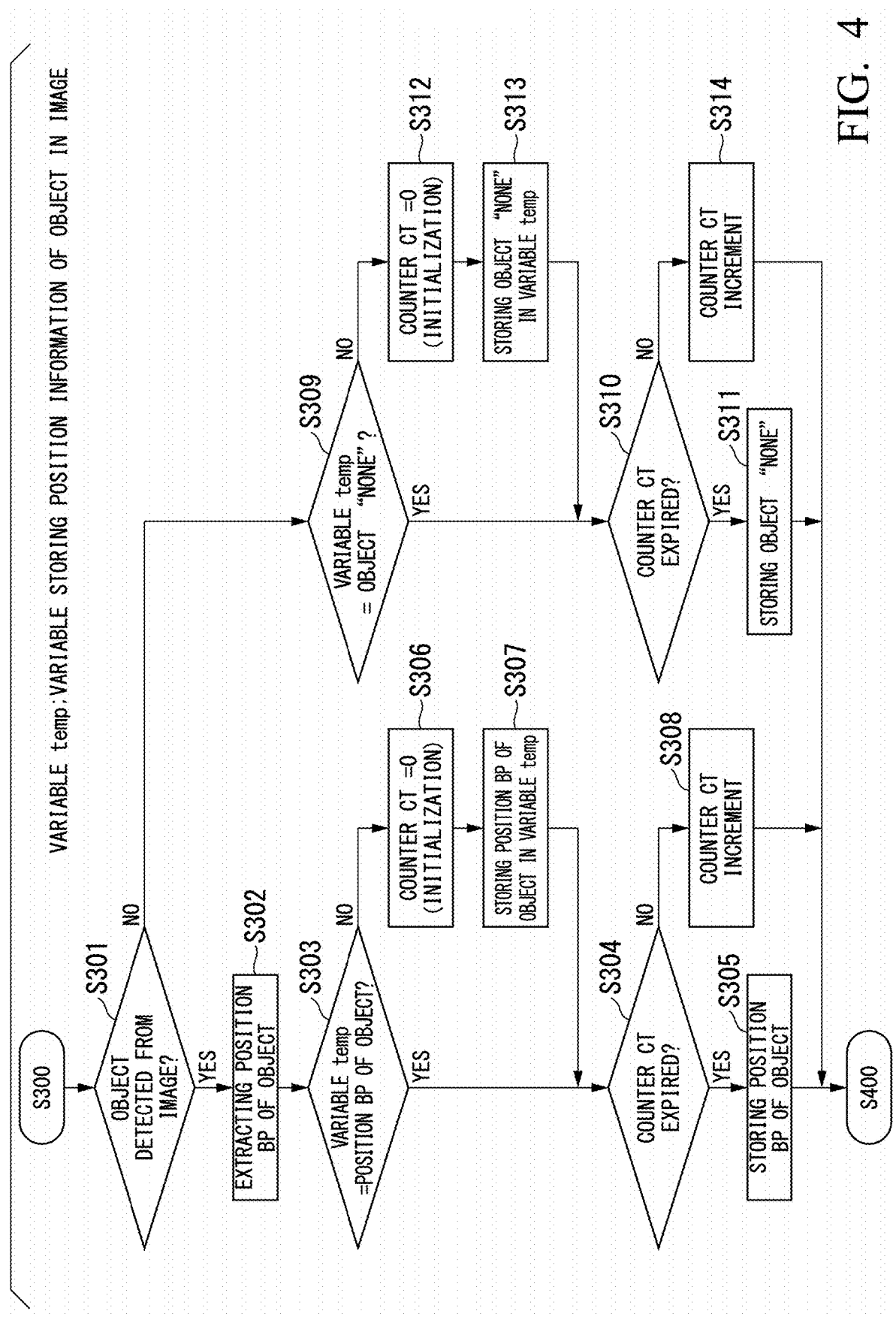
FIG. 4 is a flowchart showing an operation example of the water spout control device 20A according to some embodiments.

FIG. 4 is a flow chart showing an operation example of the water spout control device 20A according to some embodiments. Hereinafter, a flow of the prior position storage process shown in the Step S300 will be described by using FIG. 4.

The coordinate extractor 202 uses a variable temp as a premise to perform the prior position storage process. The variable temp is a variable to accommodate a positional information of the object in the image. For example, an information indicating "sink" in a case when the object is in the sink 400, an information indicating "stove" in a case when the object is at the stove 405, an information indicating "other" in a case when the object is placed at a place rather than the sink 400 and the stove 405, and an information indicating "none" in a case when the object is not existed in the image are included in the variable temp. An initial value of the variable temp may be any other value besides "sink", "stove", "other", and "none" described above. Hereinafter, an example that the initial value of the variable temp is "none" will be shown.

The coordinate extractor 202 uses a counter CT when performing the prior position storage process. The counter CT is a variable for measuring a period when the target object exists in a specified equipment, i.e. the sink 400, the stove 405, and the like.

At first, the coordinate extractor 202 determines whether the target object is detected in the image captured by the imaging device 10A according to the detection result output from the target object detector 200 (Step S301).

Next, the coordinate extractor 202 extracts the positional coordinates of the target object, that is, a position BP of the object in a case when the target object is detected from the image (Step S302). The coordinate extractor 202 determines whether the extracted position BP and the variable temp match with each other (Step S303). The coordinate extractor 202, for example, determines that the position BP to be either of "sink", "stove", "other", and "none" according to the positional coordinates of the object, and the coordinate extractor 202 determines whether the determination result and the variable temp match with each other.

In a case when the position BP and the variable temp match with each other, the coordinate extractor 202 refers to a counter value of the counter CT and determines whether the counter value of the counter CT has expired (Step S304). In a case when the counter value of the counter CT has expired, the coordinate extractor 202 makes the prior position storage 206 store the position BP of the object (Step S305). On the other hand, in a case when the counter value of the counter CT has not expired, the coordinate extractor 202 applies an increment with respect to the counter CT (Step S308). Then the water spout control device 20A performs process shown in Step S400.

On the other hand, in the process shown in Step S303, in a case when the position BP and the variable temp do not match with each other, the coordinate extractor 202 initiates the counter value of the counter CT to be zero (Step S306). Then the coordinate extractor 202 applies the value corresponding to the position BP, i.e. either of "sink", "stove", "other", and "none" to the variable temp (Step S307).

In the process shown in Step S301, in a case when the target object is not detected in the image, the coordinate extractor 202 refers to the variable temp to determine whether the value "none" is included in the variable temp (Step S309).

In the case when the value "none" is included in the variable temp, the coordinate extractor 202 refers to the counter value of the counter CT to determine whether the counter value of the counter CT has expired (Step S310). In a case when the counter value of the counter CT has expired, the coordinate extractor 202 makes the prior position storage 206 store the value "none" as the position BP of the object (Step 311). On the other hand, in a case when the counter value of the counter CT has not expired, the coordinate extractor 202 applies an increment with respect to the counter CT (Step S314). Then the water spout control device 20A performs the process shown in Step S400.

In the process shown in Step S309, in a case when the value "none" is included in the variable temp, the coordinate extractor 202 initiates the counter value of the counter CT to be zero (Step S312). Then the coordinate extractor 202 applies the value "none" with respect to the variable temp (Step S313).

Figure 5:
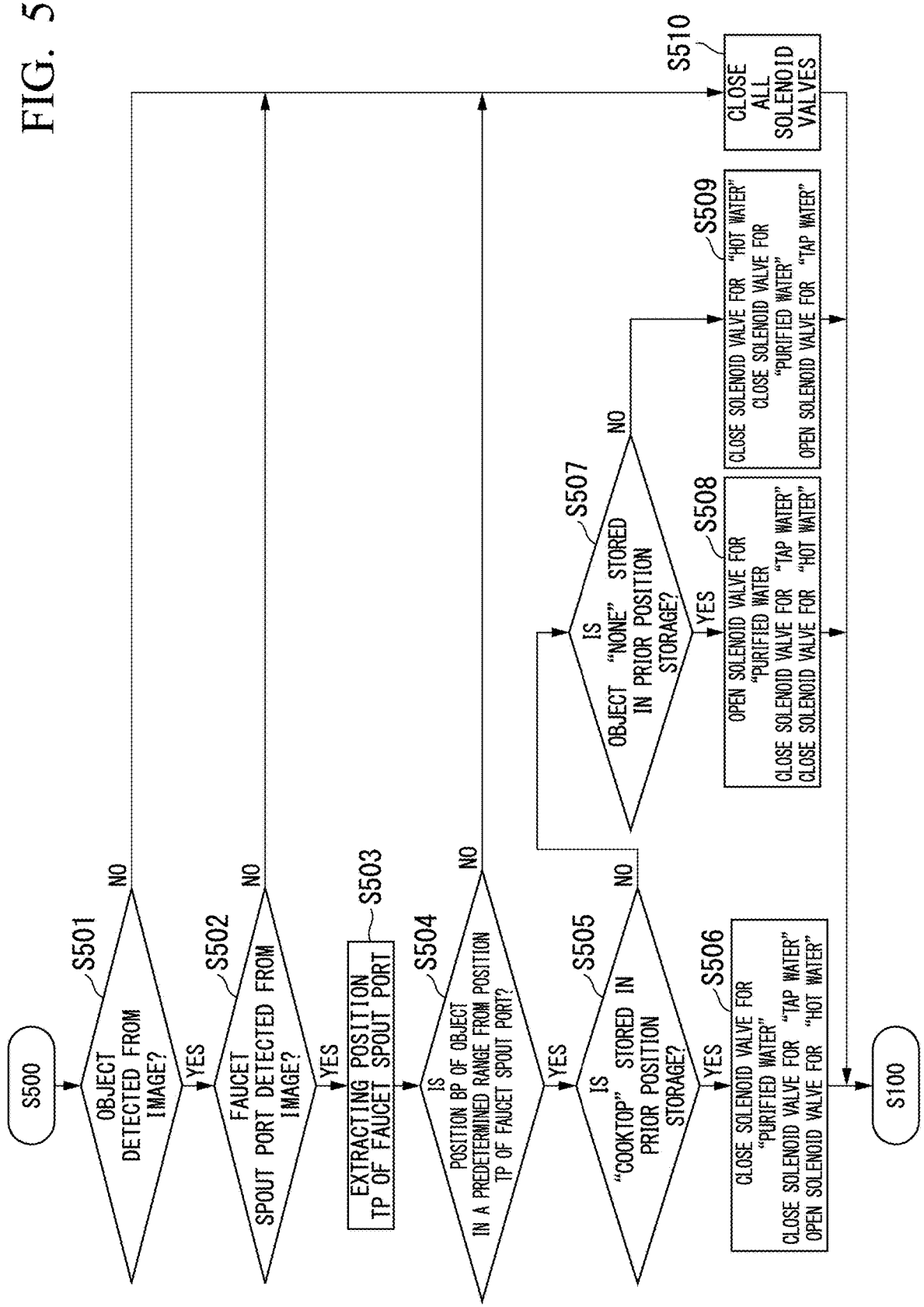
FIG. 5. is a flowchart showing an operation example of the water spout control device 20A according to some embodiments.

FIG. 5 is a flow chart showing an operation example of the water spout control device 20A according to some embodiments. Hereinafter, a flow of the switching process shown in Step S500 will be described by using FIG. 5.

At first, the target object detector 200 determines whether the object is detected in the image (Step S501). In a case when the object is detected in the image, the coordinate extractor 202 extracts the position BP of the object. The coordinate extractor 202 outputs the extracted position BP of the object to the matching detector 204.

Next, in the case when the object is detected from the image, the faucet spout port detector 201 determines whether the faucet spout port 401A is detected from the image (Step S502). In a case when the faucet spout port 401A is detected from the image, the coordinate extractor 203 extracts the positional coordinates of the faucet spout port 401A, that is, a position TP (Step S503).

The matching detector 204 determines whether the position BP of the object and the position TP of the faucet spout port 401A match with each other. Specifically, the matching detector 204 determines whether the positional coordinates of the position BP of the object are in a predetermined range from the positional coordinates of the position TP of the faucet spout port 401A (Step S504). The matching detector 204 outputs the determination result to the switcher 205.

The switcher 205 determines the type of the water to be discharged from any of tap water, purified water, and hot water according to the determination result output from the matching detector 204 and the content stored in the prior position storage 206.

Specifically, the switcher 205 refers to the prior position storage 206 to determine whether the value "stove" is stored as the prior position of the object, that is, the movement source (same in the description below) (Step S505). In a case when the value "stove" is stored as the prior position of the object, the switcher 205 outputs control signals for closing the solenoid valve 31 of purified water and the solenoid valve 30 of tap water and controls signals for opening the solenoid valve 32 of hot water to each of the solenoid valve 30, the solenoid valve 31, and the solenoid valve 32 (Step S506).

In a case when the value "stove" is not stored as the prior position of the object in the process shown in Step S505, the switcher 205 determines whether the value "none" is stored as the prior position of the object (Step S507). In a case when the value "none" is stored as the prior position of the object, the switcher 205 outputs control signals for opening the solenoid valve 31 of purified water and control signals for closing the solenoid valve 30 of tap water and the solenoid valve 32 of hot water to each of the solenoid valve 30, the solenoid valve 31, and the solenoid valve 32 (Step S508). The region where the kitchen cabinet, the workbench, the storage rack for the pot and the like are provided is not included in the imaging target region 40A such that in the case when the prior position is the value "none", the control process is performed on the assumption that the region for accommodating the target object, i.e. the storage rack for accommodating the pot when the pot 403 is regarded as the target object is the movement source.

In a case when the value "none" is not stored as the prior position of the object in the process shown in Step S507, that is, the value "sink" or the value "other" is stored as the prior position of the object, the switcher 205 outputs control signals for closing the solenoid valve 32 of hot water and the solenoid valve 31 of purified water and control signals for opening the solenoid valve 30 of tap water to each of the solenoid valve 30, the solenoid valve 31, and the solenoid valve 32 (Step S509). In a case when the value of the prior position is the "sink" or "other", the control process if performed on the assumption that the object is used at an equipment except for the stove, i.e. the workbench and then moved to the sink 400 so as to clean the slight amount of dirt adhered on the target object.

In a case when the object is not detected from the image in the process shown in Step S501, in a case when the faucet spout port 401A is not detected from the image in the process shown in Step S502, and in a case when the position BP of the object and the position TP of the faucet spout port 401A do not match with each other in the process shown in Step S504, the switcher 205 outputs control signals for closing all of the solenoid valve 30, the solenoid valve 31, and the solenoid valve 32 (Step S510).

According to the flow chart described above, the case when hot water is discharged when the value "stove" is stored in the prior position storage 206 is described as an example, however, the present water spout control method is not limited thereto.

According to the present water spout control method, a method of controlling the type of the water to be discharged according to the content stored in the prior position storage 206 may be voluntarily decided in response to a situation of the configuration of the sink 400, the stove 405 and the like, the configuration of the faucet spout 401, and the demand of the human using the sink 400.

As described above, according to the water spout control device 20A according to some embodiments, the target object detector 200 detects the position of the target object in each of the regional images in a time series, and the water spout control device 20A further includes a switcher 205 configured to switch a water discharging state regarding the water to be discharged according to the position BP of the target object at time of being detected by the target object detector 200 and the position of the target object at any time before the time when the target object is detected by the target object detector, for example, the information indicating the position of the target object stored by the prior position storage 206. Accordingly, the water spout control device 20A according to some embodiments switches the type of the water to be discharged to hot water suitable for the cleaning of the oil stain, or purified water suitable for drinking and cooking according to whether the movement source of the target object is the stove 405 or the kitchen cabinet and the like in the case when the target object such as the pot and the like is moved to the sink 400. Thus, the water spout control device 20A recognizes the actions of the human to automatically control the water discharging without integrating the camera and the sensor circuit inside the faucet.

Here, a tip end portion of the conventional faucet spout and a camera disposed at the faucet are considered as a comparison example. According to the comparison example, only a limited region under the faucet spout port 401A is imaged. Accordingly, there is possibility to distinguish the case when the cup and the like are put out to the downward space of the faucet spout port 401A, however, it is difficult to comprehend whether an intention of the human who puts the cup out is to drink the water using the cup or to clean the cup.

According to the water spout control system 1A according to some embodiments, the imaging device 10A does not only image the water equipment such as the sink 400 and the like, but also images the region including the equipment capable of being the movement source as the imaging target region 40A. Accordingly, there is possibility to detect the movement source where the target object exists before being moved to the sink 400, and there is possibility to realize the water spout control following the intention of the operating human according to the movement history of the target object.

Next, some embodiments will be described. A water spout control system 1B according to some embodiments is different from some embodiments described above in a feature of selecting the type of the water to be discharged according to a plurality of different prior positions in a time series.

Hereinafter, features different from some embodiments described above will be described, the configurations having the same or similar functions with respect to some embodiments described above will be designated as the same reference sign and the reductant description will be omitted.

Figure 6:
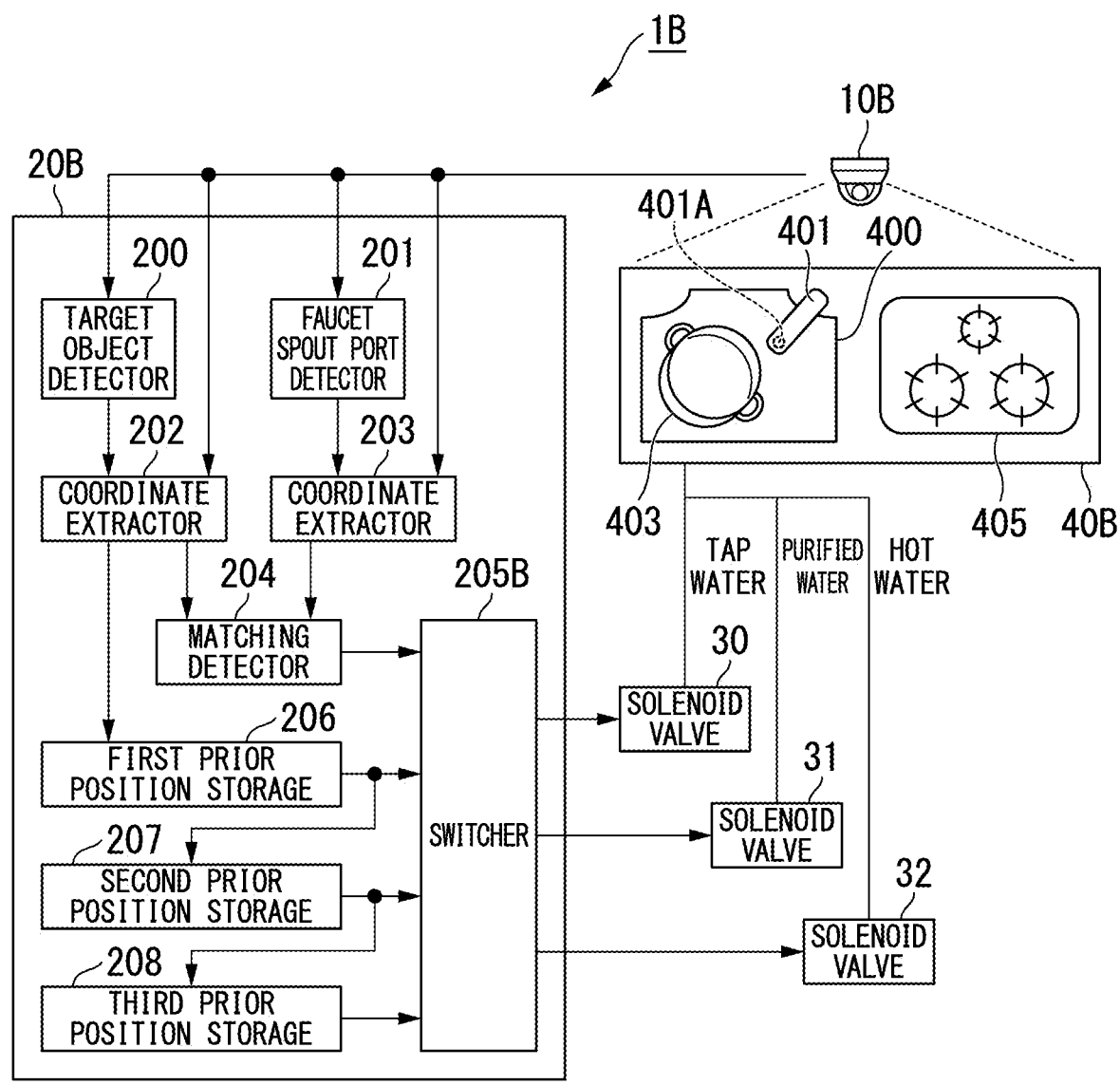
FIG. 6 is a block diagram showing a configuration example of a water spout control system 1B according to some embodiments.

FIG. 6 is a block diagram showing a configuration example of the water spout control system 1B according to some embodiments. The water spout control device 20B, for example, has a switcher 205B, a first prior position storage 206, a second prior position storage 207, and a third prior position storage 208.

In a case when it is determined that the target object exists in an equipment as the prior position for a predetermined period, the coordinate extractor 202 makes the first prior position storage 206 store an information by associating the target object and the positional coordinates. In this case, when the information indicating the prior position of the target object has already been stored in the first prior position storage 206, the coordinate extractor 202 makes the second prior position storage 207 store the information. Similarly, when the information indicating the prior position of the target object has already been stored in the second prior position storage 207, the coordinate extractor 202 makes the third prior position storage 208 store the information. In other words, the coordinate extractor 202 makes each of the first prior position storage 206, the second prior position storage 207, and the third prior position storage 208 store the movement history in the equipment where the target object exists for a certain period in a time series.

Each of the first prior position storage 206, the second prior position storage 207, and the third prior position storage 208 sequentially stores the information by associating the target object and the positional coordinates of the target object that are output from the coordinate extractor 202 in a time series.

The switcher 205B determines whether to discharge the water or not according to the detection result output from the matching detector 204. In a case that it is determined to discharge the water, the switcher 205B selects the type of the water to be discharged from either of tap water, purified water, and hot water according to the content stored in each of the first prior position storage 206, the second prior position storage 207, and the third prior position storage 208. The switcher 205B refers to each of the first prior position storage 206, the second prior position storage 207, and the third prior position storage 208 to select the type of the water to be discharged in response to the history of the prior position of the target object.

Figures 7, 8:
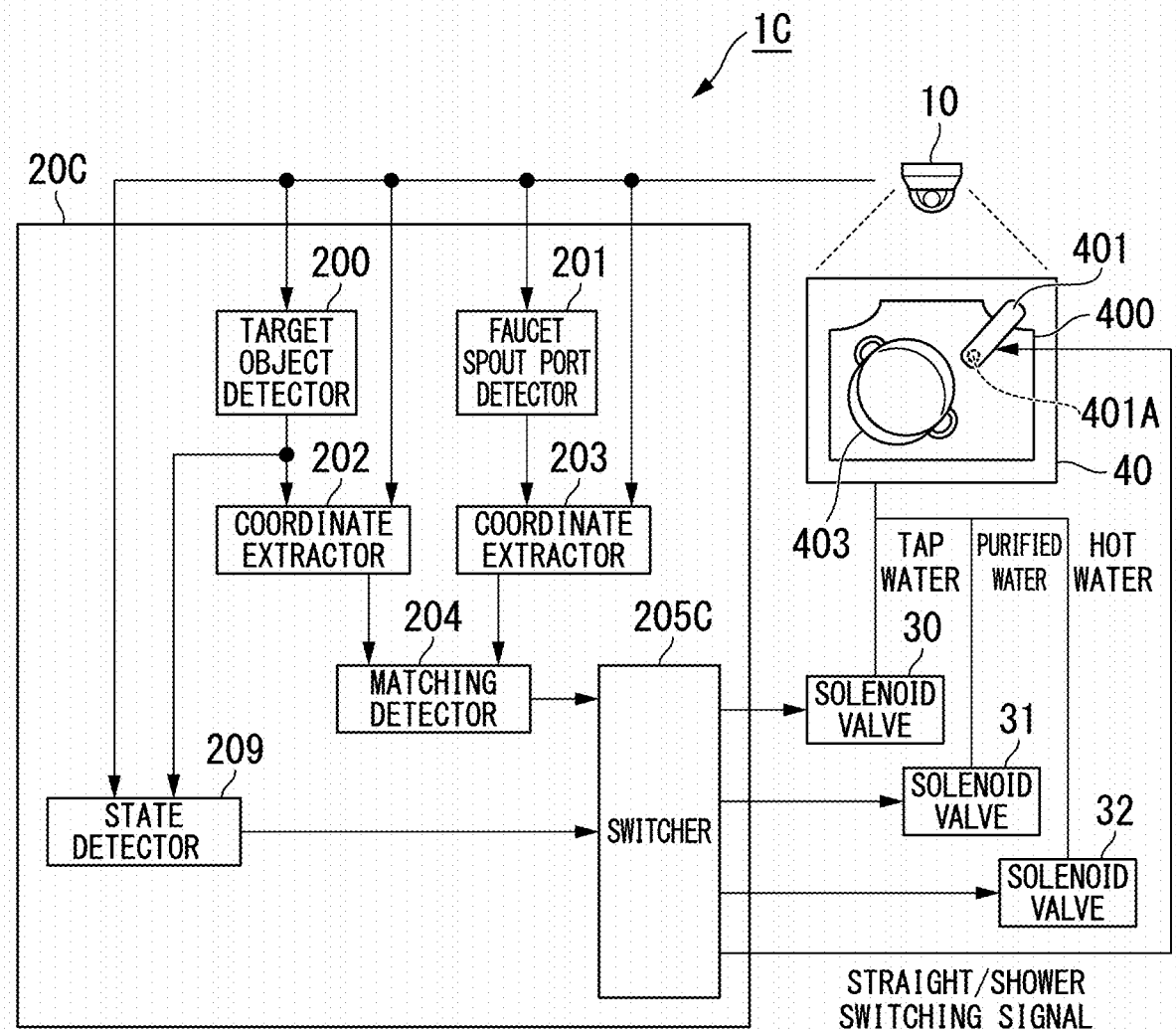
FIG. 7 is a view showing control performed by a water spout control device 20B according to some embodiments.
FIG. 8 is a block diagram showing a configuration example of a water spout control system 1C according to some embodiments.

FIG. 7 is a view showing control process performed by the water spout control device 20B according to some embodiments. Hereinafter, the process performed by the switcher 205B to switch the type of the water to be discharged according to the content stored in each of the first prior position storage 206, the second prior position storage 207, and the third prior position storage 208 will be described using FIG. 7.

In FIG. 7, various items such as a case number, a prior position 1, a prior position 2, a prior position 3, and content of a switching process are included. Regarding the case number, numbers are provided to uniquely identify cases of combinations of the prior position 1, the prior position 2, and the prior position 3.

Regarding the prior position 1, the prior position 2, and the prior position 3, cases of the movement history of the target object are shown. In the example of FIG. 7, the newest prior position in a time series is shown as the prior position 1, an older prior position is shown as the prior position 2, and the oldest prior position is shown as the prior position 3.

Regarding the content of the switching process, the content of switching the type of the water to be discharged by the switcher 205B is shown with respect to each case number.

At first, as shown in the case number 1 in FIG. 7, the process by the switcher 205B in a case when the target object, i.e. the pot 403 and the cup is moved from the "sink 400" to the "stove 405", then moved from the "stove 405" to "none", that is, moved to the dining table, the workbench, and the kitchen cabinet and the like which is not imaged, and at last moved to the "sink 400" will be described.

In this case, according to the operations by the human to move the target object following the history shown in the case number 1, the switcher 205B recognizes that the human fills the target object with the water at the sink 400 according to the item of prior position 3, then the human moves the target object with the water filled to the stove 405 for cooking and the like according to the item of prior position 2, and then operations of dishing up the cooked food from the target object to the dishes at the dining table or the workbench according to the item of prior position 1.

In a case when the empty target object, i.e. the pot 403 and the cup is moved to the sink 400 after such movement history, the switcher 205B recognizes that the human moving the empty target object attempts to clean the used empty target object. In the case, the switcher 205B makes the faucet 401 to discharge hot water. Since it is assumed that oil stain adheres to the pot 403 used for cooking at the stove 405, it is more suitable to use hot water to clean the oil stain than using tap water.

Next, as shown in the case number 2 in FIG. 7, the process by the switcher 205B in a case when the target object is moved from "none", that is, the dining table, the workbench, and the kitchen cabinet to the "sink 400" will be described.

In this case, according to the operations by the human to move the target object following the history shown in the case number 2, the switcher 205B recognizes that the human does not move the target object to the stove 405 in advance according to the items from prior position 1 to prior position 3 and the human moves the target object to the sink 400 such that the switcher 205B recognizes that the human fetches the target object before being used from the storage rack or the kitchen cabinet and moves the target object to the sink 400.

In a case when the target object, i.e. the pot 403 and the cup before being used is moved to the sink 400 after such movement history, the switcher 205B recognizes that the human attempts to fill the target object with the water at the sink 400 for usage. In this case, the switcher 205B makes the faucet spout 401 to discharge purified water. It is because purified water is more suitable for cooking and drinking compared with tap water.

Next, as shown in the case number 3 in FIG. 7, the process by the switcher 205B in a case when the target object is moved from "none", that is, the dining table, the workbench, and the kitchen cabinet to the "sink 400", then becomes "none" again, and then moved to the "sink 400" will be described.

In this case, according to the operations by the human to move the target object following the history shown in the case number 3, the switcher 205B recognizes that the target object, i.e. the pot 403 and the cup is fetched from the storage rack and the kitchen cabinet and used at the time when the human firstly moves the target object to the sink 400 according to the items of the prior position 3 and the prior position 2. The switcher 205B recognizes that the target object such as the pot 403 and the cup filled with the water is used at the dining table or used for cooking at the workbench at the time when the human next moves the target object to "none", that is, the dining table and the workbench that are not captured in the image according to the item of the prior position 1.

In a case when the target object, i.e. the pot 403 and the cup used at the dining table and the workbench is moved to the sink 400 after such movement history, the switcher 205B recognizes that the human attempts to place the used target object in the sink 400 for cleaning. In this case, the switcher 205B makes the faucet spout 401 to discharge tap water. Compared with the case when the oil stain adheres to the pot 403 that is used at the stove 405, it is assumed that only slight amount of dirt adheres to the target object which is drunk or used at the place such as the dining table or the workbench different from the stove 405 such that tap water rather than hot water is suitable for cleaning the slight amount of dirt.

Accordingly, a situation of wastefully using hot water and purified water to clean the slight amount of dirt is avoided, and there is possibility to avoid excessive usage of hot water and purified water so as to avoid useless energy consumption.

As described above, according to the water spout control device 20B according to some embodiments, the switcher 205B switches the water discharging state according to a change of the positions of the target object, for example the content stored in the first prior position storage 206, the second prior position storage 207, and the third prior position storage 208, detected by the target object detector 200 in the time series. Accordingly, in the case of moving the target object such as the pot and the like to the sink 400, there is possibility for the water spout control device 20B according to some embodiments to switch the type of the water to be discharged to hot water suitable for cleaning the oil stain or purified water suitable for drinking and cooking according to the movement history of the target object. Thus, the water spout control device 20B recognizes the operations of the human to automatically control the water discharging without integrating the camera and the sensor circuit inside the faucet.

Next, some embodiments will be described. A water spout control system 1C according to some embodiments is different from some embodiments described above in that the water spout control system 1C selects a form of water to be discharged from either of a straight water flow or a shower water flow while selecting a type of the water to be discharged according to a state of the target object. The form of the water to be discharged is an example of the "water discharging state".

Hereinafter, features different from some embodiments described above will be described, the configurations having the same or similar functions with respect to the embodiments described above will be designated as the same reference sign and the reductant description will be omitted.

FIG. 8 is a block diagram showing a configuration example of the water spout control system 1C according to some embodiments. A water spout control device 20C, for example, has a switcher 205C and a state detector 209. The water spout control device 20C is connected with a switching mechanism configured to switch the form of the water discharging of the faucet spout 401 that is not shown in figures, the solenoid valve 30 for discharging tap water, the solenoid valve 31 for discharging purified water, and the solenoid valve 32 for discharging hot water.

The state detector 209 detects a state of the target object when the target object exists in the image according to the image of the imaging target region 40 captured by the imaging device 10 and the detection result by the target object detector 200. The state of the target object refers to a dirty state of the target object, for example, a state of the target object without any dirt before being used, a dirty state of the target object after being used, and a state indicating a dirty degree when the target object is in the dirty state.

For example, in a case when the detection result by the target object detector 200 indicates that the target object exists in the image, the state detector 209 extracts a region of the target object from the image.

For example, the state detector 209 stores a plurality of images in advance, wherein the plurality of images of the target object such as the dishes and the like are captured in various dirty states from a slightly dirty state to a heavily dirty state such as the oil stain and the like. The state detector 209 sets the same scale for the images of the target object in various dirty states and stored in advance and the image of the target object extracted from the image captured by the imaging device 10, and the state detector 209 compares pixels in the two images. For example, in a case when a tendency of color distribution per each pixel matches with each other at a degree equal to or more than a predetermined threshold, the state detector 209 determines that the dirt on the target object in the two images are at the same degree. The state detector 209 outputs the detection result to the switcher 205C.

The switcher 205C determines whether to discharge the water according to the detection result output from the matching detector 204. In a case when it is determined to discharge the water, the switcher 205C selects the type of the water to be discharged from either of tap water, purified water, and hot water, and the switcher 205C selects the form of the water to be discharged from the straight water flow or the shower water flow, for example, according to the dirty degree of the target object detected by the state detector 209.

For example, in a case when the detection target object is the pot 403, and it is determined that no dirt adheres to the detection target object by the state detector 209, the switcher 205C performs the water discharging by selecting purified water as the type of the water to be discharged and the straight water flow as the form of the water to be discharged. It is because that in a case of filing the pot for cooking with the water, in other words, storing the water in the pot, it is not necessary to perform the shower water flow and the straight water flow is suitable.

For example, in a case when the detection target object is the pot 403, and it is determined that heavy dirt adheres to the detection target object by the state detector 209, the switcher 205C performs the water discharging by selecting hot water as the type of the water to be discharged and the shower water flow as the form of the water to be discharged. It is because that hot water is suitable for cleaning the heavy dirt adhering to the pot 403, and the shower water flow capable of discharging the water by a high water pressure in a wide range is suitable compared with the straight water flow.

For example, in a case when the detection target object is the cup, and it is determined that litter dirt adheres to the detection target object by the state detector 209, the switcher 205C performs the water discharging by selecting tap water as the type of the water to be discharged and the shower water flow as the form of the water to be discharged. It is because that tap water is suitable for cleaning the litter dirt adhering to the cup, and the shower water flow capable of discharging the water by a high water pressure in a wide range is suitable.

As described above, the case in which the state detector 209 determines the dirty state of the target object according to the region of the dirt and the color is described as an example, however, the present disclosure is not limited thereto. The state detector 209 may determine the dirty state of the target object according to an orientation of the target object when the target object is put out to the faucet spout port 401A, in other words, how the human holds the target object, or the human places the target object in which orientation.

For example, in a case when the detection target object is a cup and the cup is held or placed under the faucet spout port 401A with a lip toward the upward direction, that is, toward the vertically upward direction, the state detector 209 determines that there is no dirt adhering to the detection target object and the cup is put out for storing the drinking water. In this case, the switcher 205C discharges purified water to the detection target object, i.e. the cup in the form of the straight water flow.

In a case when the detection target object is a cup and the cup is held or placed under the faucet spout port 401A with the lip toward a different direction from the upward direction, for example, the cup is held or placed with the lip toward a horizontal direction, i.e. the left/right direction, the state detector 209 determines that there is dirt adhering to the detection target object and the cup is put out for cleaning. In this case, the switcher 205C discharges tap water to the detection target object, i.e. the cup in the form of the shower water flow.

As described above, the water spout control device 20C according to some embodiments further has the state detector 209 configured to determine the state of the target object according to the image captured by the imaging device 10 and the target object detected by the target object detector 200. The switcher 205C switches the water discharging state according to the state of the target object detected by the state detector 209. Accordingly, in the case when the target object such as the pot and the like is moved to the sink 400, the water spout control device 20C according to some embodiments switches the type of the water to be discharged and the form of the water to be discharged according to the dirty state of the target object. Thus, the water spout control device 20C recognizes the operations of the human to automatically control the water discharging without integrating the camera and the sensor circuit inside the faucet.

Next, some embodiments will be described. A water spout control system 1D according to some embodiments is different from some embodiments described above in that the water spout control system 1D selects the type of the water to be discharged, the form of the water to be discharged, a temperature and a water pressure of the water to be discharged, and a flow rate according to characteristic of actions of a human being captured in the image. The temperature and the water pressure of the water to be discharged, and the flow rate are examples of the "water discharging state".

Hereinafter, features different from some embodiments described above will be described, the configurations having the same or similar functions with respect to the embodiments described above will be designated as the same reference sign and the reductant description will be omitted.

Figure 9:
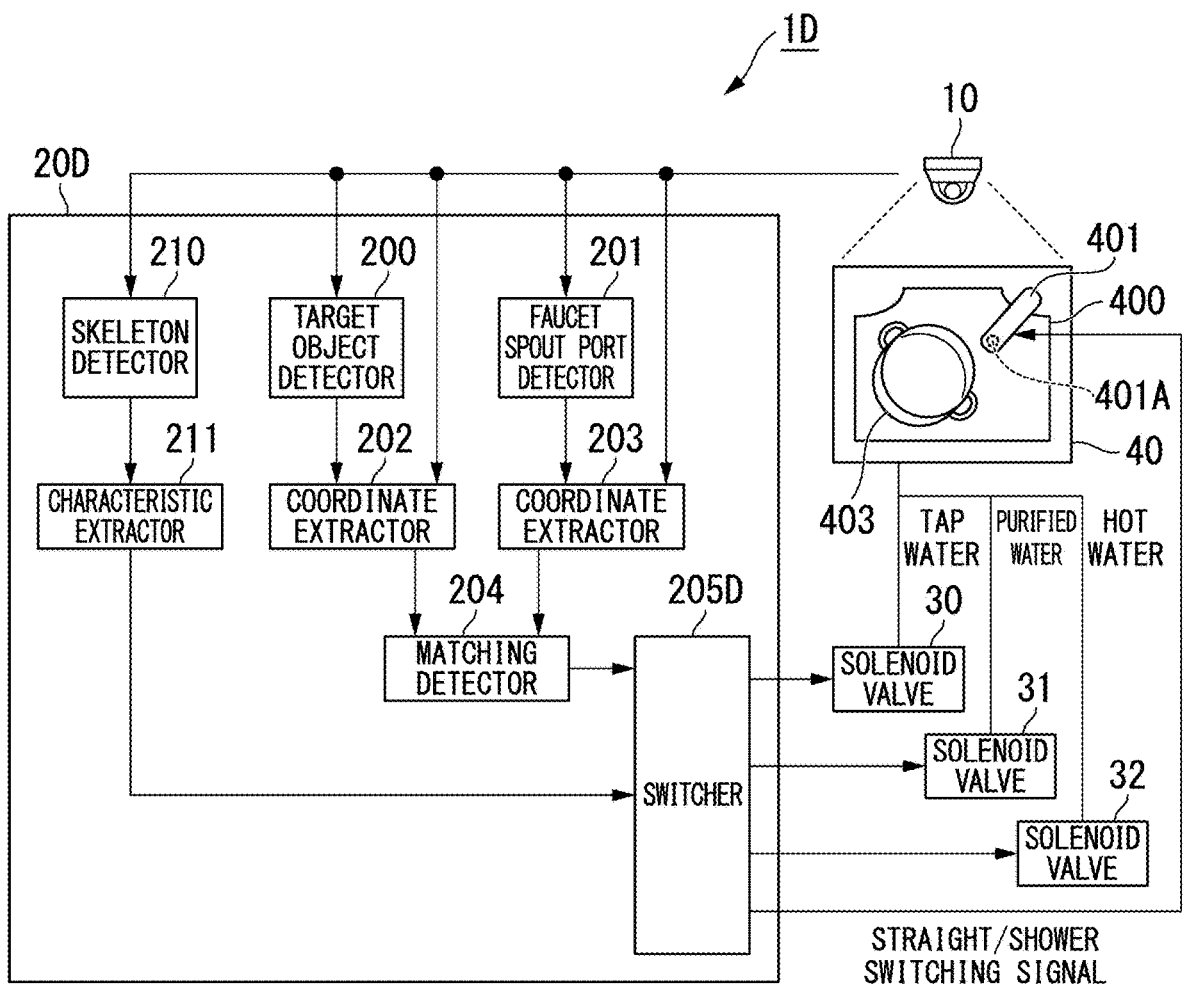
FIG. 9 is a block diagram showing a configuration example of a water spout control system 1D according to some embodiments.

FIG. 9 is a block diagram showing a configuration example of the water spout control system 1D according to some embodiments. For example, a water spout control device 20D has a skeleton detector 210, a characteristic extractor 211, and a switcher 205D.

The skeleton detector 210 detects the actions of the human being captured in the image according to the image captured by the imaging device 10. For example, the skeleton detector 210 acquires an information corresponding to the actions of the human by using a camera, i.e. an infrared camera and a sensor, i.e. a motion sensor. The skeleton detector 210 extracts joints of the human according to the information corresponding to the actions of the human that is acquired by using the infrared camera and the like, and the skeleton detector 210 detects the skeleton of the human by connecting the extracted joints according to the skeleton structure of the human. The skeleton detector 210 outputs an information corresponding to the actions and the skeleton of the detected human to the characteristic extractor 211.

The characteristic extractor 211 extracts the characteristic of the actions of the human according to the information corresponding to the actions and the skeleton of the human detected by the skeleton detector 210. For example, the characteristic extractor 211 assumes a body height and a shoulder length according to the information corresponding to the skeleton and extracts the characteristic such as whether the human captured in the image is an adult or a child, and whether the human is a man or a woman if the human is an adult.

The characteristic extractor 211 extracts the characteristic of the actions of the human according to the information corresponding to the actions of the human detected by the skeleton detector 210. The characteristic of the actions of the human is characteristic of the way to use his/her own body for each human such as whether there is a tendency of pulling the right shoulder than the left shoulder, whether there is a tendency of lifting the right shoulder than the left shoulder, and whether the human is right-handed or left-handed. The characteristic extractor 211 output an information indicating the extracted characteristic to the switcher 205D.

The switcher 205D determines whether to perform the water discharging according to the detection result output from the matching detector 204, and in a case of performing the water discharging, the switcher 205D selects the type of the water to be discharged, the form of the water to be discharged, the water pressure, and the flow rate according to the characteristic extracted by the characteristic extractor 211.

For example, the switcher 205D adjusts the water pressure of the water to be discharged so as to avoid the water pressure from being too strong in a case when the human operating at the sink 400, that is, an example of the human captured in the image is assumed to be a child or an elderly human by the characteristic extractor 211. For example, the switcher 205D adjusts the temperature of hot water to be discharged so as to avoid the temperature from being too high in a case when the human operating at the sink 400 is assumed to be a child or an elderly human by the characteristic extractor 211. In this case, the characteristic extractor 211 assumes that the human captured in the image is an elderly human in a case where a size of the skeleton of the human detected by the skeleton detector 210 is at the same size as a skeleton of an adult, and the change of the actions of the human detected by the skeleton detector 210 is at a speed lower than a predetermined threshold.

The switcher 205D may control the water discharging to be in the straight water flow form with a higher flow rate than usual in a case when the human operating at the sink 400 is assumed to be an adult man, and the switcher 205D may control the water discharging to be in the shower water flow form with a lower flow rate and more soften than usual in a case when the human operating at the sink 400 is assumed to be an adult woman.

As described above, the water spout control device 20D according to some embodiments further has a characteristic extractor 211 configured to extract the characteristic of the human in the regional image according to the regional image captured by the imaging device 10. The switcher 205D switches the water discharging state according to the characteristic of the human in the regional image extracted by the characteristic extractor 211. Accordingly, the water spout control device 20D according to some embodiments switches the characteristic of the human who moves the target object such as the pot and the like to the sink 400 and operates at the sink 400, and the water spout control device 20D switches the type of the water to be discharged and the form of the water discharging in response to the characteristic of the human. Thus, the water spout control device 20D recognizes the operations of the human to automatically control the water discharging without integrating the camera and the sensor circuit inside the faucet.

As described above, the case when the characteristic extractor 211 extracts the characteristic of the human according to the skeleton detected by the skeleton detector 210 is described as an example, however, the present disclosure is not limited thereto. For example, the characteristic extractor 211 may extract the characteristic of the human by performing a face authentication and a motion detection in the image captured by the imaging device 10.

Next, some embodiments will be described. A water spout control system 1E according to some embodiments is different from some embodiments described above in that the water spout control system the water spout control system 1E selects the type of the water to be discharged, the form of the water to be discharged, the water pressure of the water to be discharged, and the flow rate according to prior actions of a human being captured in the image. Hereinafter, features different from some of the embodiments described above will be described, the configurations having the same or similar functions with respect to some of the embodiments described above will be designated as the same reference sign and the reductant description will be omitted.

Figure 10:
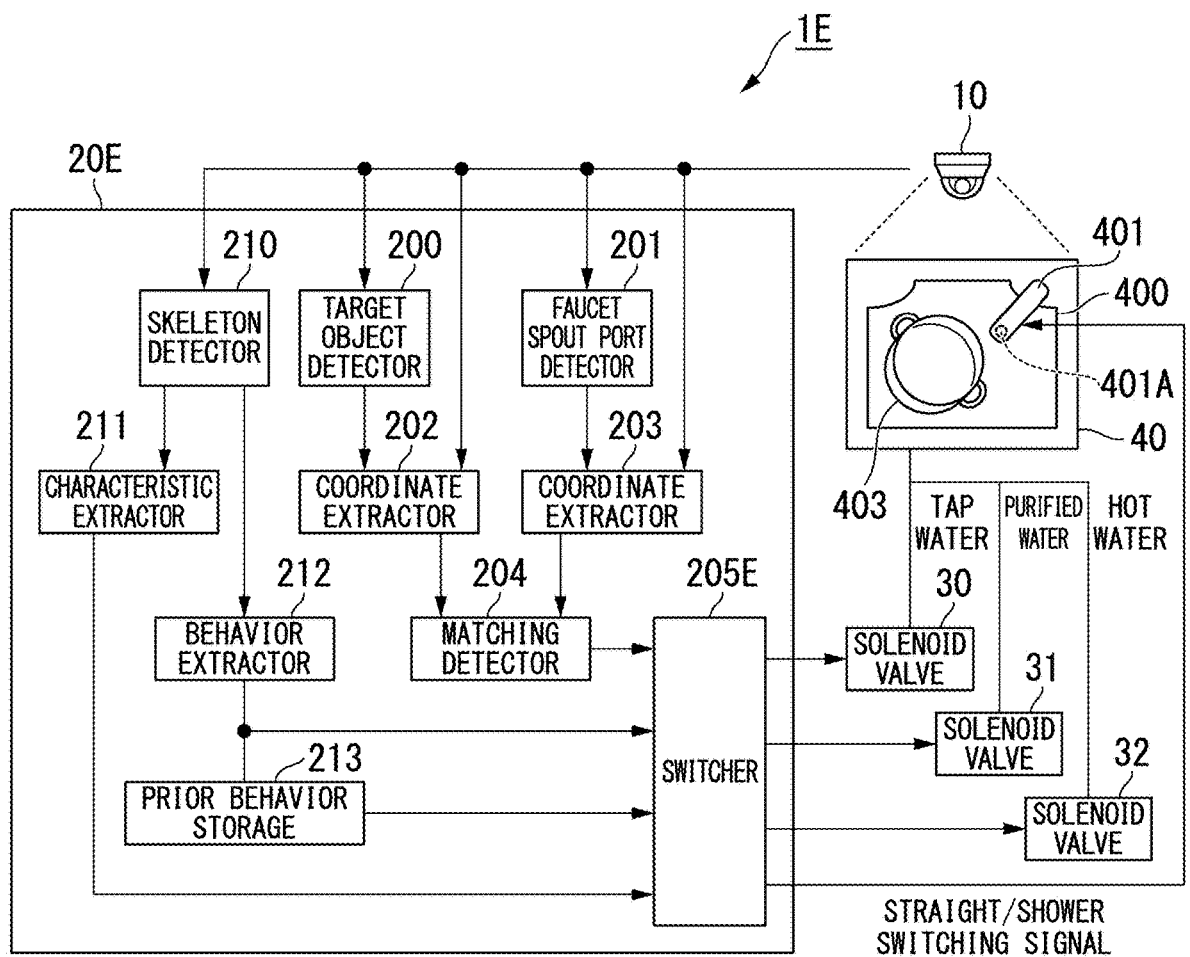
FIG. 10 is a block diagram showing a configuration example of a water spout control system 1E according to some embodiments.

FIG. 10 is a block diagram showing a configuration example of the water spout control system 1E according to some embodiments. The water spout control device 20E, for example, has a behavior extractor 212, a prior behavior storage 213, and a switcher 205E.

The skeleton detector 210 outputs an information corresponding to the actions and skeleton of the detected human to the characteristic extractor 211 and outputs to the behavior extractor 212 at the same time.

The behavior extractor 212 extracts the behavior of the human according to the information corresponding to the detected actions of the human by the skeleton detector 210. The actions of the human refer to a movement source position of the human operating at the wet area such as the sink 400 and the like when the human moves to the sink 400. For example, the actions of the human refer to a movement history such as whether the human exists at the stove 405 or at the workbench before the human starts to clean at the sink 400. The behavior extractor 212 makes the prior behavior storage 213 to store an information by associating the human and positional coordinates when the behavior extractor 212 determines that the human exists at the equipment of the movement source such as the stove 405 for a predetermined period.

The prior behavior storage 213 stores the information by associating the human and the positional coordinates output by the behavior extractor 212.

The switcher 205E determines whether to perform the water discharging according to the detection result output from the matching detector 204. In a case of performing the water discharging, the switcher 205D selects the type of the water to be discharged, the form of the water to be discharged, the water pressure, and the flow rate according to the content stored in the prior behavior storage 213. The switcher 205E refers to the prior behavior storage 213 to select the type of the water to be discharged and the like corresponding to the movement source of the human.

For example, in a case when the target object is the pot 403, and the human operating at the sink 400 exists before the stove 405 before moving to the sink 400, the switcher 205E recognizes that the human performs cooking at the stove 405 and then attempts to clean the used pot 403 at the sink 400, and the switcher 205E controls to discharge hot water in the form of shower water flow. In this case, for example, when the operating human is an adult man, the switcher 205E controls to increase the flow rate, and when the operating human is an adult woman, the switcher 205E controls to decrease the flow rate so as to control the flow rate to be suitable for the operating human.

For example, in a case when the target object is the cup and the human operating at the sink 400 exists before the kitchen cabinet before moving to the sink 400, the switcher 205E recognizes that the human attempts to drink water using the cup fetched from the kitchen cabinet, and the switcher 205E controls to discharge purified water in the form of straight water flow. In this case, for example, the switcher 205E controls to decrease the flow rate of the water when the operating human is a child so as to control the water to slowly fill the cup.

The water spout control device 20E according to some embodiments described above, further has the behavior extractor 212 configured to extract the movement source of the human in the image according to the image captured by the imaging device 10. The switcher 205E is configured to switch the water discharging state according to the movement source of the human operating at the sink 400 extracted by the behavior extractor 212. Accordingly, the water spout control device 20E according to some embodiments switches the type of the water to be discharged and the form of the water discharging in response to the prior position of the human who moves the target object such as the pot 403 and the like to the sink 400 and operates at the sink 400. Thus, the water spout control device 20E controls the water discharging in response to the movement history of the human without integrating the camera and the sensor circuit inside the faucet.

As described above, the case when the behavior extractor 212 extracts the behavior of the human according to the skeleton detected by the skeleton detector 210 is described as an example, however, the present disclosure is not limited thereto. For example, the behavior extractor 212 may extract the behavior of the human by performing a face authentication and a motion detection in the image captured by the imaging device 10.

Next, some embodiments will be described. A water spout control system 1F according to some embodiments is different from some of the embodiments described above in that the water spout control system 1F selects the type of the water to be discharged, the form of the water to be discharged, the water pressure of the water to be discharged, and the flow rate according to an intention of the operating human.

According to some embodiments, in a case when the human operating at the wet area such as the sink 400 and the like considers the water discharging state controlled by the water spout control system 1F not to be an intended state of the human, the operating human instructs to switch the water discharging. A voice instruction refers the instruction for switching the water discharging state selected by the water discharging control system 1F. For example, in a case when the human puts the pot 403 to the faucet spout port 401A and purified water is discharged from the faucet spout port 401A, if the human intends to fill the pot 403 with hot water, the human instructs to switch the water to be discharged to hot water by voice.

For example, in a case when the pot 403 without any dirt is put out under the faucet spout 401 and the water spout control system 1F controls to discharge purified water, if the human intends to cook using purified water, the human does not instruct to switch the water discharging. On the other hand, in case when the water spout control system 1F instructs to discharge purified water, however the human intends to boil hot water quickly by filling the pot 403 with hot water and then moving the pot 403 to the stove 405, the human instructs to switch the water discharging to discharge hot water. According to the some embodiments, control process of switching the water discharging following the intention of each operating human is performed according to the instructions by the voice of the operating human.

Hereinafter, features different from some of the embodiments described above will be described, the configurations having the same or similar functions with respect to some of the embodiments described above will be designated as the same reference sign and the reductant description will be omitted.

Figure 11:
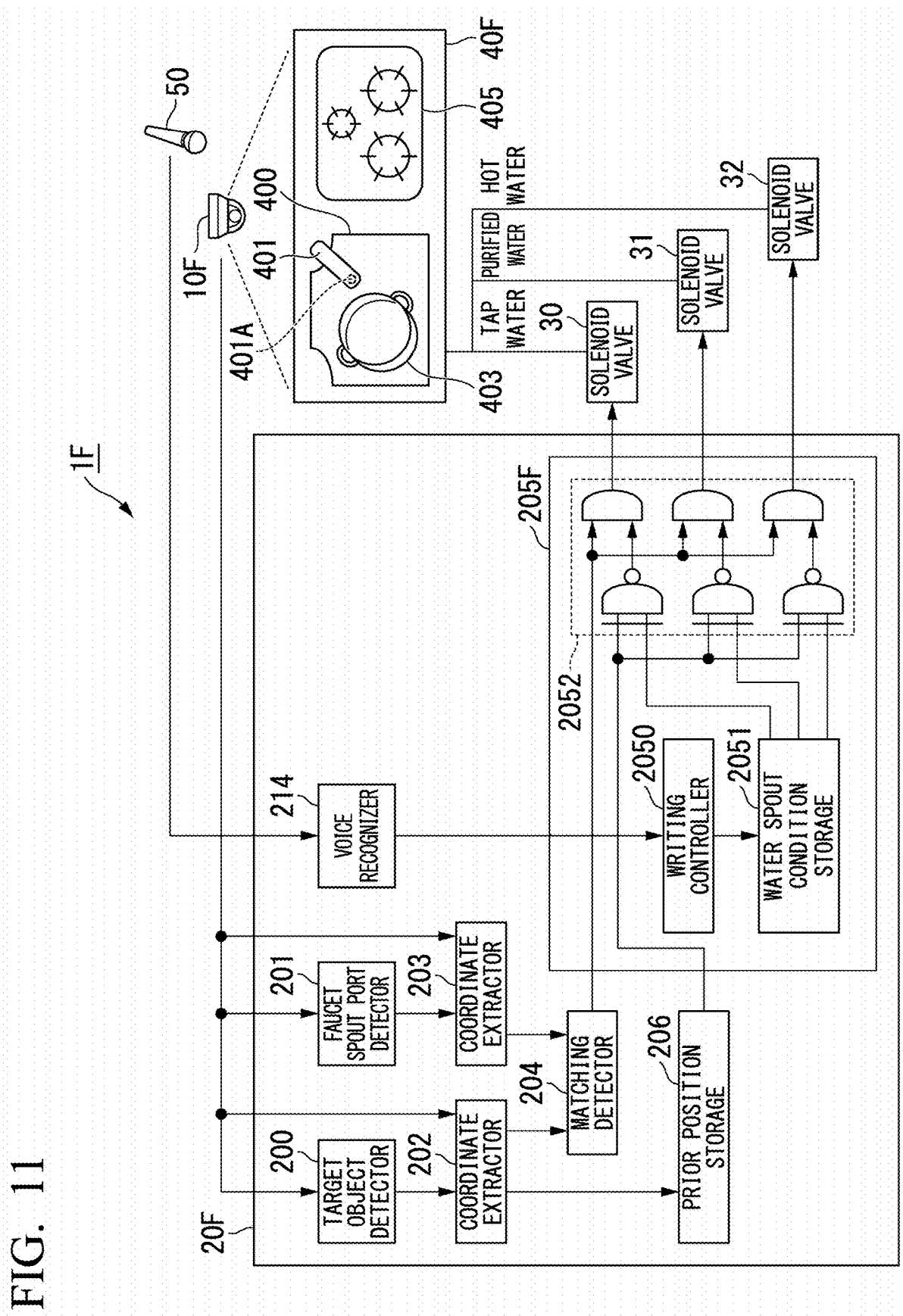
FIG. 11 is a block diagram showing a configuration example of a water spout control system 1F according to some embodiments.

FIG. 11 is a block diagram showing a configuration example of the water spout control system 1F according to some embodiments. The water spout control system 1F, for example, has an imaging device 10F, a water spout control device 20F, and a microphone 50. A voice information acquired by the microphone 50 is an example of the "instruction information".

The microphone 50 acquires voice from the human operating at the wet area such as the sink 400. The microphone 50 outputs the information indicating the acquired voice to the water spout control device 20F.

The water spout control device 20F, for example, has a voice recognizer 214 and a switcher 205F. The voice recognizer 214 is an example of "instruction detector".

The voice recognizer 214 recognizes content of the voice from the human operating at the wet area such as the sink 400 according to the information indicating the voice acquired from the microphone 50. The voice recognizer 214 recognizes whether the operating human is instructing to switch the water discharging state with respect to the process performed by the water spout control system 1F according to the information indicating the voice. In a case when the human is instructing to switch the water discharging state, the voice recognizer 214 recognizes which water discharging matches the intention of the human. The voice recognizer 214 outputs an information indicating the content of the instruction to the switcher 205F when the human instructs to switch the water discharging state.

The switcher 205F has a writing controller 2050, a water spout condition storage 2051, and a condition updater 2052.

The writing controller 2050 makes the water spout condition storage 2051 to store an instruction information according to the content of the information for switching the water discharging recognized by the voice recognizer 214. For example, in a case when the instruction information for switching the water discharging by the voice recognizer 214 is recognized, the writing controller 2050 makes the water spout condition storage 2051 to store an information indicating which water discharging to perform in response to the prior position stored by the prior position storage 206.

The water spout condition storage 2051 stores an information indicating which water discharging to perform by the human who instructs to switch the water discharging controlled by the writing controller 2050. For example, in a case when the pot 403 is moved from the state outside the image to the sink 400 and then put out to the faucet spout port 401A and the like such that purified water should be discharged following an ordinary condition according to the detection result of the matching detector 204 and the prior position storage 206, if there is an instruction for switching to discharge hot water, the water spout condition storage 2051 stores an information indicating to fill the pot 403 with hot water even if the condition is the same.

The condition updater 2052 controls the water discharging state according to each of the detection result of the matching detector 204, the content stored in the prior position storage 206, and the content stored in the water spout condition storage 2051. For example, even if ordinarily purified water should be discharged in a case when the pot 403 existed in the storage rack is put out to the faucet spout port 401A and the like, if the information indicating that the operating human captured in the image instructs to discharge hot water is stored in the water spout condition storage 2051, the condition updater 2052 instructs to discharge hot water. In other words, in a case of discharging the water according to the position of the detected target object, the condition updater 2052 individually changes the water discharging condition so as to follow the intention of the operating human and apply customization in response to the desired water discharging state by the operating human. That is, the condition updater 2052 updates the water discharging condition for switching the water discharging state in response to the intention of the operating human.

As described above, the water spout control device 20F according to some embodiments further has the voice recognizer 214 configured to detect the content of the instruction, i.e. the content of an oral instruction according to the instruction information for instructing the water discharging state, i.e. the voice information of the voice acquired by the microphone 50. The switcher 205F switches the water discharging state according to the recognition result of the voice recognizer 214. Accordingly, the water spout control device 20F according to some embodiments switches the type of the water to be discharged and the form of the water discharging in response to the content of the instruction by the voice of the human operating at the sink 400. Thus, the water spout control device 20F controls the water discharging in response to the intention shown by the human without integrating the camera and the sensor circuit inside the faucet.

In the water spout control device 20F according to some embodiments, the switcher 205F updates the water discharging condition for switching the water discharging state according to the recognition result of the voice recognizer 214. Accordingly, the water spout control device 20F according to some embodiments controls the water discharging following the water discharging state desired by the human using the sink 400.

As described above, the example in which the water spout control device 20F controls the water discharging state according to the voice recognized by the voice recognizer 214 is described, however, the present disclosure is not limited thereto. For example, the water spout control device 20F may control the water discharging state according to a specified body gesture and a hand gesture of the human.

In this case, for example, the water control device 20F has a motion detector which is not shown in figures and is configured to detect the instruction for switching the water discharging state performed by motions of the human such as the specified body gesture and the hand gesture according to the image captured by the imaging device 10F. The motion detector outputs the information indicating the instruction for switching the detected water discharging state to the switcher 205F. The image information of the image captured by the imaging device 10F is an example of the "instruction information". The motion detector is an example of the "instruction detector".

The specified body gesture and the hand gesture of the human includes the operations of the human to directly operate the faucet. The operation to operate the faucet includes operations such as turning the faucet or operating the handle to water discharging, i.e. single lever. Accordingly, in a case that the water discharging is directly operated by moving a manual valve of a conventional single lever, there is possibility to detect content of the operation, and then to determine that it is the intention of the human operating at the wet area such as the sink 400 to update the water discharging condition.

On the other hand, in a case when the human performs the operation of the conventional water discharging, the water discharging state may be controlled in response to the operation. Accordingly, the human operating the single lever and the like can naturally control the water discharging state without feeling unnatural.

The whole or part of the process performed by the water spout control devices 20, 20A-20F according to some embodiments described above may be realized by a computer. In this case, a program for realizing such functions may be recorded in a computer-readable recording medium as a program, and the processing described above is performed when the program is read by the computer and executed by the computer. The "computer system" refers to a system including an operating system (OS) and hardware such as peripheral devices. The "computer-readable recording medium" refers to a removable medium such as a flexible disk, a magneto-optical disk, a read-only memory (ROM), and a compact disk read-only memory (CD-ROM), and a storage unit such as a hard disk disposed inside the computer system. Furthermore, in a case that the program is transferred through a network such as the internet and a communication line such as the telephone line, the "computer-readable recording medium" may refer to the communication line that is configured to maintain the program temporarily and dynamically, or the "computer-readable recording medium" may refer to the device configured to maintain the program for a certain period such as a volatile memory inside the computer system used as a server or a client. The program may be a program for realizing part of the functions described above, the program may be combined with the program recorded in the computer system to realize the functions, and the program may be realized by using a programmable logical device such as a field-programmable gate array and the like.

Although some embodiments of the present disclosure have been described above, the present disclosure is not limited to the embodiments described herein nor to modifications thereof. Additions, omissions, substitutions and other changes in the structure are possible without departing from the teachings of the present disclosure. The present disclosure is not limited by the foregoing description.

According to some embodiments described above, a water spout control device, a water spout control system, and a water spout control method can be provided to control water discharging in response to a detection result without integrating a camera and a sensor circuit inside a faucet.

What is claimed is:

1. A water spout control device, comprising:
a target object detector configured to detect a position of a target object as a detection target in a regional image according to an image information of the regional image, the regional image being generated by capturing an imaging target region including a faucet spout from a upward side of the faucet spout;
a faucet spout port detector configured to detect a position of a faucet spout port of the faucet spout in the regional image; and
a determiner configured to determine whether to discharge water according to the position of the target object detected by the target object detector and the position of the faucet spout port detected by the faucet spout port detector.

2. The water spout control device of claim 1,
wherein the regional image is sequentially captured in a time series to form a plurality of regional images,
the target object detector is configured to detect the position of the target object in each regional image of the plurality of regional images, and
the water spout control device further includes a switcher configured to switch a water discharging state regarding the water to be discharged according to the position of the target object at time when the target object is detected by the target object detector and the position of the target object at any time before the time when the target object is detected.

3. The water spout control device of claim 2, wherein the switcher is configured to switch the water discharging state according to a change of the positions of the target object detected by the target object detector in the time series.

4. The water spout control device of claim 2, further comprising a state detector configured to detect a state of the target object according to the regional image and the target object detected by the target object detector,
wherein the switcher is configured to switch the water discharging state according to the state of the target object detected by the state detector.

5. The water spout control device of claim 2, further comprising a characteristic extractor configured to extract characteristic of a human in the regional image according to the regional image,
wherein the switcher is configured to switch the water discharging state according to the characteristic of the human extracted by the characteristic extractor.

6. The water spout control device of claim 2, further comprising a behavior extractor configured to extract a behavior of a human in the regional image according to the regional image,
wherein the switcher is configured to switch the water discharging state according to the behavior of the human extracted by the behavior extractor.

7. The water spout control device of claim 2, further comprising an instruction detector configured to detect a content of an instruction according to an instruction information indicating the instruction to switch the water discharging state,
wherein the switcher is configured to switch the water discharging state according to the content of the instruction detected by the instruction detector.

8. The water spout control device of claim 2, further comprising an instruction detector configured to detect content of an instruction according to an instruction information indicating the instruction to switch the water discharging state,
wherein the switcher is configured to update the water discharging condition to switch the water discharging state according to the content of the instruction acquired from the instruction detector.

9. The water spout control device of claim 2, wherein the water discharging state is at least one of a type of the water to be discharged or a form of the water to be discharged.

10. A water spout control system, comprising:
an imaging device configured to capture a regional image including a faucet spout, and
the water spout control device of claim 2, which is configured to acquire the image information of the regional image captured by the imaging device.

11. The water spout control device of claim 1, wherein the faucet spout port detector is configured to receive positional coordinates of the faucet spout port so as to detect the position of the faucet spout port of the faucet spout in the regional image.

12. A water spout control method, comprising:
detecting a position of a target object as a detection target in a regional image according to an image information of the regional image in which an imaging target region including a faucet spout from a upward side of the faucet spout, by a target object detector;
detecting a position of a faucet spout port of the faucet spout in the regional image, by a faucet spout port detector; and
determining whether to discharge water according to the position of the target object detected by the target object detector and the position of the faucet spout port detected by the faucet spout port detector, by a determiner.

* * * * *